United States Patent [19]

Daniel

[11] 4,391,584

[45] Jul. 5, 1983

[54] NON-CONTACT INFRARED FABRIC TEMPERATURE MONITORING

[75] Inventor: Vernon T. Daniel, Oak Ridge, N.C.

[73] Assignee: Burlington Industries, Inc., Greensboro, N.C.

[21] Appl. No.: 301,438

[22] Filed: Sep. 11, 1981

[51] Int. Cl.³ .............................. F27B 9/28; F27B 9/40; F27D 19/00; G01D 11/24

[52] U.S. Cl. .......................................... 432/8; 73/431; 236/15 BB; 432/37; 432/45; 432/50

[58] Field of Search .......................... 432/8, 37, 45, 50; 236/15 BB; 73/431

[56] References Cited

U.S. PATENT DOCUMENTS

| | | | |
|---|---|---|---|
| 1,945,652 | 2/1934 | Martin | 432/50 |
| 2,856,542 | 10/1958 | McPheeters | 250/239 |
| 2,872,173 | 2/1959 | Munker | 432/8 |
| 3,310,356 | 3/1967 | Borberg | 350/63 |
| 3,343,823 | 9/1967 | Schmeiser et al. | 432/50 |
| 3,358,974 | 12/1967 | Bernard | 432/8 |
| 3,436,965 | 4/1969 | Land | 73/355 |
| 3,472,497 | 10/1969 | Preszler | 432/50 |
| 3,565,516 | 2/1971 | Thomas et al. | 350/319 |
| 4,063,458 | 12/1977 | Vogt et al. | 73/355 |

OTHER PUBLICATIONS

"Operating Manual for System 3,000 Series" by Williamson Corp. of Concord, MA, 1977, pp. 6 through 12, 27, 30 & associated flyer.

Primary Examiner—John J. Camby
Attorney, Agent, or Firm—Cushman, Darby & Cushman

[57] ABSTRACT

The temperature of an open textile web is monitored by a sensing unit including an infrared pyrometer. The pyrometer is disposed at a viewing angle between about 5°–25° with respect to the horizontal. A housing mounts the pyrometer, a fan, a filter bag connection, and an exhaust tube. The exhaust tube extends through the wall of a textile-treating oven, with an air flow through the tube preventing pyrometer contamination.

12 Claims, 4 Drawing Figures

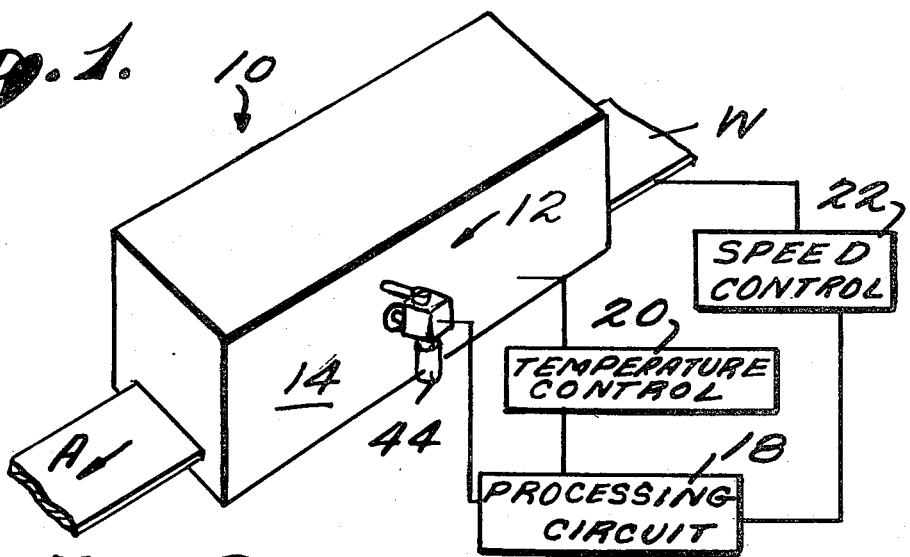
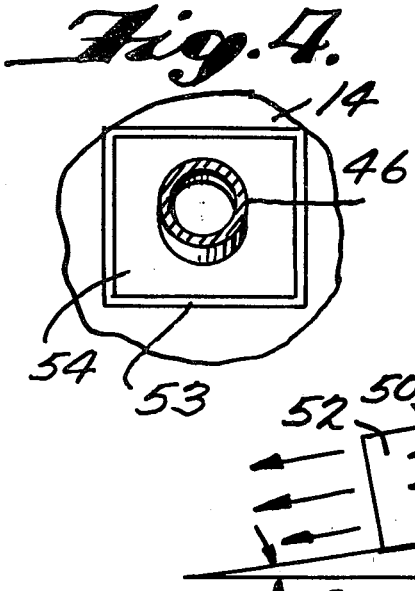
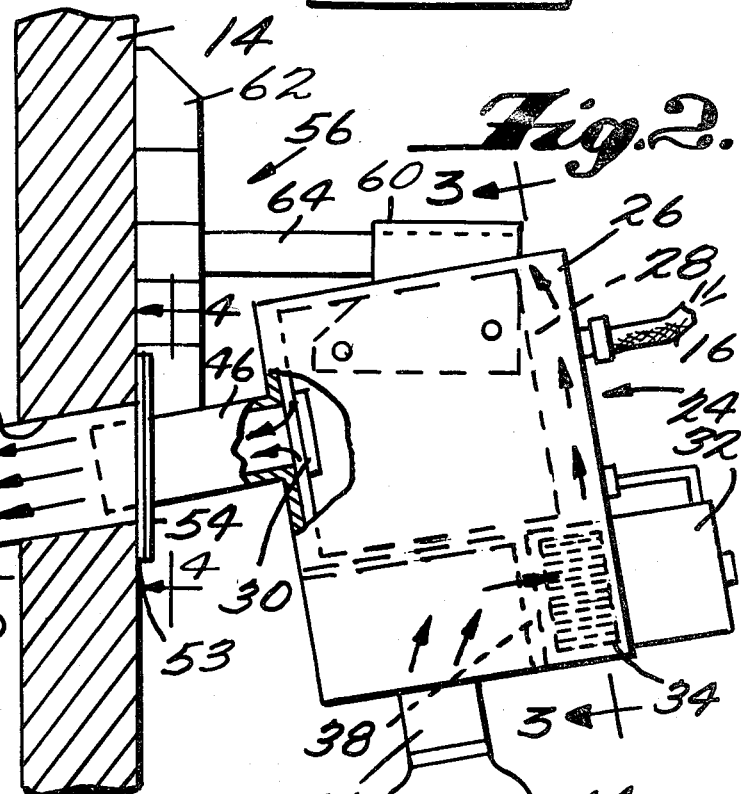
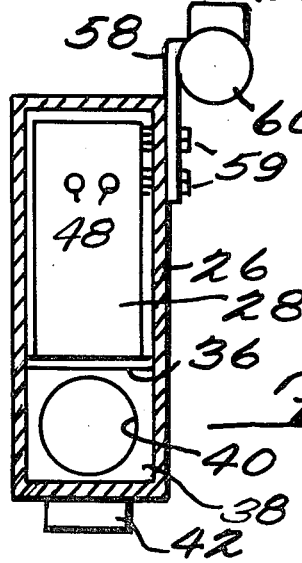

NON-CONTACT INFRARED FABRIC TEMPERATURE MONITORING

BACKGROUND AND SUMMARY OF THE INVENTION

Where it is necessary to obtain a temperature measurement and it is impractical or impossible to make direct contact with the material to be measured, infrared pyrometers are generally successful in taking the temperature measurements. However attempts to utilize infrared pyrometers in textile environments for measuring the temperature of a textile web in a textile web treating oven, most commonly a tenter frame, have met with little success. The textile oven atmosphere is filled with contamination and lint which distort the signal received by the pyrometer. Additionally, the contamination and lint can accumulate on the lens of the pyrometer and affect the calibration and sensitivity thereof. Further, the textile web (fabric)—though generally considered a black body—exhibits a range of openness, and the exact readings cannot be obtained if the optical path passes through the open areas of the fabric. Additionally, the temperature within the instrument can become high enough to exceed the maximum temperatuure specified for it.

According to the present invention, a sensing unit is provided that can be utilized in textile environments, particularly in association with a textile web treating oven, or tenter frame, and for the practice of a method of determining and controlling textile web temperatures in a textile web treating oven. According to the invention all of the problems associated with conventional sensors utilized in textile environments have been overcome, and the invention is capable of accurately determining (and controlling) web temperature in a textile web treating oven over extended periods of time.

An exemplary sensing unit according to the present invention is adapted to be associated with a textile web treating oven, or other adverse environment apparatus, containing a structure whose temperature is to be sensed. The unit includes an infrared pyrometer and a fan, in a housing containing and mounting the pyrometer and the fan. An exhaust tube communicates with the interior of the housing and extends outwardly therefrom in operative association with a sensing portion of the pyrometer. Filter connection means are provided on the housing for facilitating connection of a filtering element to the housing, and means are provided defining an air flow passageway in the housing from the filter connection, to the fan, past the pyrometer, and to and through the exhaust tube. The filter connection comprises a short tube, and a filter bag is mounted on the end of the short tube. A bracket mounts to the exterior of the housing and the bracket includes a rod-receiving opening formed therein for receiving a stationarily mounted rod to mount the housing on the rod. The rod-receiving opening preferably makes an angle of between about 5° to 25° with respect to the exhaust tube.

The sensing unit according to the invention is preferably provided in a textile oven-sensor combination. An oven, having an exterior wall, has means defining an opening extending through the wall from the exterior of the oven to the interior thereto. A tube, referred to as a through-tube to distinguish it from an exhaust tube associated with the sensing unit, extends through the opening from the interior to the exterior of the oven. A seal is mounted on the exhaust tube to seal it with respect to the outside air. A bracket assembly means is provided for mounting the housing to the oven wall exterior surface so that the exhaust tube extends from the housing, exteriorly of the oven wall, through the seal and into the through-tube. The bracket assembly means comprises a bracket mounted to the sensing unit housing, and a substantially horizontally extending rod fixedly mounted to the oven exterior wall and extending outwardly from the oven wall. The fixed rod is received by a bracket rod-receiving opening in the housing.

According to the invention a method of measuring and controlling textile web temperatures in a textile web treating oven utilizing the above-described sensing unit is provided. The method comprises the steps of: Passing an open textile web in a first generally horizontal direction through a textile oven, the web being disposed substantially in a horizontal plane. Providing an opening in the textile oven adjacent an area wherein the web passes through the oven (as, for example, where the web reaches peak temperature). Mounting an infrared pyrometer so that it is in operative association with the oven opening and so that the pyrometer is disposed at a viewing angle of between about 5° to 25° with respect to the horizontal, preferably about 10°. Obtaining temperature reading and, in response to the temperature readings determined by the pyrometer, controlling oven temperature and/or other factors to maintain the textile web at a predetermined desired temperature when passing through the oven. The spectral range of the pyrometer is preferably selected so that it is between about 2.8–3.3 microns. The pyrometer is cooled by a continuous flow of cooling and purge air to maintain its temperature at an operable level, and to prevent contamination thereof.

In the past, when pyrometers have been utilized with textile ovens, it has always been thought that the angle of viewing should be at least 45°. However according to the present invention it has been found that—contrary to the teachings of the art—such an angle of viewing is too large, causing the pyrometer readings to be influenced by the temperature of objects behind the fabric web, which objects are viewed through the inherent openings in the fabric. According to the present invention it has been found that when the viewing angle is between about 5°–25° the pyrometer is not influenced by objects behind the fabric, and true readings can be achieved. The tighter the textile web (e.g. denim and corduroy) the less critical the viewing angle becomes; however for open textile webs (e.g. conventional woven fabrics) a viewing angle of between about 5° to 25° is critical.

BRIEF DESCRIPTION OF THE DRAWINGS

FIG. 1 is a schematic perspective view illustrating exemplary apparatus for the practice of an exemplary method according to the invention;

FIG. 2 is a side elevational view (with portions cut away for clarity) of an exemplary apparatus according to the present invention, shown in conjunction with an oven wall which is shown in cross-section;

FIG. 3 is a cross-sectional view of the sensing unit of FIG. 2 taken along lines 3—3 thereof; and FIG. 4 is a cross-sectional view taken along lines 4—4 of FIG. 2.

DETAILED DESCRIPTION OF THE DRAWINGS

FIG. 1 schematically illustrates exemplary apparatus that can be utilized for practicing a method of measuring and controlling textile web temperature according to the present invention. An open (e.g. conventional woven fabric) textile web W is disposed in a substantially horizontal plane, and passes in a first generally horizontal direction A through a textile web treating oven 10, such as a conventional tenter oven. In order to minimize energy waste and minimize air pollution, while obtaining a high quality product, it is necessary to properly control the temperature, and especially the maximum temperature of the web W in the tenter oven 10. This is accomplished according to the invention utilizing the sensing apparatus 12, which includes an infrared pyrometer, the apparatus 12 being mounted in association with the oven 10 adjacent an area where the web W passes through the oven (and preferably where the web reaches peak temperature, if only one structure 12 is employed).

Preferably the apparatus 12 is mounted in a side wall 14 of the oven 10. The pyrometer in apparatus 12 is mounted so that it is disposed at a viewing angle of between about 5° and 25° with respect to the horizontal so that background objects in the oven 10—which otherwise would be "visible" to the pyrometer through the open portions of the web W—do not distort the temperature readings thereof. The temperature readings of the unit 12 pass through line 16 to conventional processing circuitry 18, which circuitry 18 can be used to regulate the temperature controller 20 for the oven 10. In addition to regulating temperature controller 20, or in place of such regulation, other factors may also be controlled by the circuitry 18. For instance the circuitry 18 may regulate the speed control 22 for the web W.

FIGS. 2 through 4 illustrate in detail exemplary sensing apparatus 12 and a preferred manner of mounting thereof in association with the oven wall 14. Apparatus 12 includes an integral sensing unit, shown generally by reference numeral 24, which comprises a housing 26 containing and mounting a conventional infrared pyrometer 28 (having a viewing lens 30), and a fan 32, including fan blades 34. In the preferred embodiment illustrated in the drawings (see FIGS. 2 and 3), the pyrometer 28 is mounted on the wall of the housing supporting the fan 32, with suitable spacers to hold the pyrometer away from the wall to provide an air gap for cooling. A generally horizontally extending wall 36 within the housing 26 helps to direct cooling air to the fan and around the pyrometer. A generally vertical dividing wall 38, with large opening 40 therein, extends downwardly from one end of the divider 36 to the bottom of the housing 26. A short tube 42 in communication with the interior of the housing 26 and extending downwardly therefrom provides a means for connection of a conventional filter bag 44 to the housing 26.

Extending from the housing 26 adjacent the viewing lens 30 of pyrometer 28 is an exhaust tube 46. The exhaust tube 46 is in open communication with the interior of the housing 26. Terminals 48 of the pyrometer 28 are opposite the tube 46, and are connected to the electrical control lines 16 leading from pyrometer 28 to processing circuitry 18.

Means are provided for defining an air flow passageway in the housing 26 from the filter connection tube 42, to the fan blades 34, past the pyrometer 28, and to and through the exhaust tube 46, as illustrated by the air flow arrows in FIG. 2. The air flow passageway preferably is provided by leaving a clearance area along the sides, back, top, and front of the pyrometer 28 (see FIGS. 2 and 3) for the flow of air.

The sensing unit 24 is provided in combination with the oven 14 to effect temperature determination of the fabric. A circular opening 50 (see FIG. 2) is provided extending through the oven wall 14, and a circular through-tube 52 is mounted within the opening 50. The through-tube 52 has a conventionally square flange 53 of sheet metal welded to its outer end, which flange 53 (see FIG. 4) typically measures about 6×6-in, has a central hole through which the through-tube passes, and abuts the exterior surface of oven wall 14. Overlying flange 53 is a typically $\frac{1}{8}$×6×6-in square sheet 54 of silicone rubber or the like bearing a central hole slightly smaller than exhaust tube 46, to effect a tight seal between exhaust tube and sheet. Flange 53 and sheet 54 are held to oven wall 14 by means of an overlying light metal peripheral frame (not shown) and screws.

A bracket assembly means, illustrated generally at 56 in FIG. 2, mounts the sensing unit 24 to the oven wall 14 so that the exhaust tube 46 extends from exteriorly of the oven wall, through the silicone rubber sheet 54, and into the through-tube 52. This mounting is accomplished so that the pyrometer 28 is disposed at an effective viewing angle α (see FIG. 2), which angle α is between about 5° and 25° with respect to the horizontal, preferably 10°. The bracket assembly means 56 includes a bracket 58 which is mounted to a side wall of the housing 26, as by nuts and bolts 59 (see FIG. 3). The bracket 58 includes a rod-receiving tubular portion 60 thereof.

Fixed to the oven wall 14 is a wall bracket 62 which has a horizontally extending rod 64 extending outwardly therefrom. The bracket tube 60 and the rod 64 are dimensioned so that the tube 60 receives the rod 64 as illustrated in FIG. 2. The interior opening of the tubular portion 60 preferably makes the same angle with respect to the exhaust tube 46. In this way, the proper angular orientation of the pyrometer 28 may easily be provide merely by mounting the rod 64 to ensure that it is horizontal, and placing the tube 60 over the rod 64, the exhaust tube 46 then automatically assuming the proper orientation. It is desirable to make the opening 50 so that it also is at the angle α, although because the through-tube 52 can be made very much larger than the exhaust tube 46, the exact angle of the opening 50 is not critical.

Operation

In the preferred manner of the practice of the invention for monitoring and controlling the temperature of an open textile web, an opening 50 is formed in an oven wall 14, and a bracket 62 with horizontally extending rod 64 is mounted adjacent the opening 50. Through-tube 52 is inserted into the opening 50. Sensing unit 24 is mounted on bracket 62, rod 64 being received by tubular portion 60 of bracket 58 attached to housing 26. The exhaust tube 46 extends through the silicone rubber sheet 54 and is sealed with respect to the outside air and makes an angle (between about 5° and 25°) with respect to the horizontal.

The oven 10 is heated, and the open textile web W is passed through the oven 10 in the horizontal direction A. Electricity is supplied to the pyrometer 28 by line 16, with the lens 30 of the pyrometer receiving radiations from the web W within the oven 10. Electricity is also supplied to fan 32, which rotates fan blade 34 drawing air from exterior of the oven 10 through the filter bag 44, through short tube 42, through opening 40 in vertical wall 38, around the rear, both sides, top, and front of pyrometer 28 to exhaust through exhaust tube 46 into through-tube 52, and to ultimately pass into the interior of the oven 10. This flow of air cools the pyrometer 28 to ensure that it does not exceed a temperature of about 130° F. (depending upon the maximum operating temperature of the particular pyrometer 28), and the flow of air additionally serves to prevent contamination and lint from the interior of the oven 10 coming in contact with the pyrometer 28, affecting readings of the pyrometer 28, or fouling the pyrometer lens 30.

The spectral range of the pyrometer 28 is selected so that it is preferably between about 2.8-3.3 microns, which has been determined by testing to be the optimum spectral band for determining textile web W temperatures. The unit 12 is preferably mounted at a portion of the oven 10 where the web W reaches peak temperature, but it may be mounted elsewhere, or more than one unit may be employed in multiple locations.

Temperature readings from pyrometer 28 are passed to processing circuitry 18, which controls oven temperature controller 20 and/or web speed controller 22 or the like to ensure that a desired temperature is reached and that the peak temperature of the web W does not exceed a predetermined value characteristic for that web. In this way energy waste and pollution are minimized, while the quality of the web W is maximized.

It will thus be seen that according to the present invention a simple and efficient sensing unit for ensuring proper operating temperature and for preventing fouling of an infrared pyrometer is provided. Also, according to the present invention the temperature of an open textile web in a textile oven is controlled to minimize energy waste and air pollution, and maximize product quality. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method of determining textile web temperatures in a textile web treating oven utilizing an infrared pyrometer, comprising the steps of:
   passing an open textile web in a first generally horizontal direction through a textile oven, the web being disposed substantially in a horizontal plane;
   providing an opening in the textile oven passing from the exterior into the interior thereof, and adjacent an area wherein the web passes through the oven;
   mounting an infrared pyrometer so that it is in operative association with the oven opening and so that the pyrometer is disposed at a viewing angle of between about 5°-25° with respect to the horizontal; and
   determining textile web temperatures with the pyrometer.

2. A method as recited in claim 1 comprising the further step of selecting the spectral range of the pyrometer so that it is between about 2.8-3.3 microns.

3. A method as recited in claims 1 or 2 comprising the further step of providing a continuous flow of cooling and purge air from an area exterior of the oven, past the pyrometer, and into the oven through the opening therein, so that the pyrometer will be maintained at appropriate operating temperature and will not be fouled by contaminants from the interior of the oven.

4. A method as recited in claim 3 wherein said purge air continuous flow step is accomplished by mounting the pyrometer in a housing with a fan and filter, with an exhaust tube extending outwardly from the housing in operative communication with the pyrometer; and by mounting the housing to a side wall of the oven so that the exhaust tube extends through a seal in the oven side wall, and so that air is drawn through the filter by the fan, passes around the pyrometer, and passes through the exhaust tube into the oven.

5. A method as recited in claim 1 comprising the further step of—in response to the temperature readings determined by the pyrometer—controlling oven temperature and/or other factors to maintain the textile web at a predetermined temperature when passing through the oven.

6. A method as recited in claim 5 wherein said opening-providing step is practiced where the web reaches peak temperature, and wherein said controlling step is practiced so that the peak temperature is controlled so that energy waste is minimized while insuring proper treatment of the web.

7. A method as recited in claims 1 or 6 wherein said mounting step is practiced so that the viewing angle is about 10°.

8. An oven-sensor combination comprising:
   an oven having an exterior wall;
   means defining an opening extending through said wall from the exterior of the oven to the interior thereof;
   a tube extending through said opening from the interior to the exterior of said oven;
   a sensing assembly including a housing mounting a pyrometer, and having an exhaust tube extending from said housing said exhaust tube having smaller cross-sectional dimensions than said through-tube and extending partially into it;
   a seal mounted on said through-tube to seal the portion of said exhaust tube extending into said through-tube with respect to said through-tube; and
   a bracket assembly means for mounting said housing to said oven wall exterior surface so that said exhaust tube extends from said housing, exteriorly of said oven wall, through said seal and into said through-tube.

9. A combination as recited in claim 8 wherein said bracket assembly means comprises means for mounting said exhaust tube and housing to said oven wall so that said pyrometer is disposed at an effective viewing angle of between about 5°-25° with respect to the horizontal.

10. A combination as recited in claim 9 wherein said bracket assembly means comprises a bracket mounted to an exterior wall of said housing and including a rod-receiving opening formed therein, said rod-receiving opening disposed at the same angle of about 5°-25° with respect to said exhaust tube as said exhaust tube is disposed with respect to the horizontal; and a substantially horizontally extending rod fixedly mounted to said oven exterior wall and extending outwardly therefrom, said rod received by said bracket rod-receiving opening.

11. A combination as recited in claims 8 or 13 wherein said sensing assembly comprises a self-contained unit including a fan and a filter connection tube mounted in and in operative association with said housing; and means defining an air flow passageway in said housing from said filter-connection, to said fan, past said pyrometer, and to and through said exhaust tube.

12. A sensing unit adapted to be associated with an adverse environment containing a structure to be sensed, said unit comprising:

an infrared pyrometer;

a fan;

a housing containing and mounting said pyrometer and said fan;

an exhaust tube in communication with the interior of said housing and extending outwardly therefrom in operative association with a sensing portion of said pyrometer;

filter connection means provided on said housing for facilitating connection of a filtering element to said housing said filter connection means comprising a short tube, and means for mounting a filter bag on the end of said short tube;

means defining an air flow passageway in said housing from said filter connection, to said fan, past said pyrometer, and to and through said exhaust tube; and a bracket mounted to the exterior of said housing, said bracket including a rod-receiving opening formed therein for receiving a stationarily mounted rod to mount said housing on said rod; and wherein said rod-receiving opening makes an angle of between 5°–25° with respect to said exhaust tube.

* * * * *